(12) United States Patent
Nigul (10) Patent No.: US 12,493,893 B2
(45) Date of Patent: Dec. 9, 2025

(54) RELATING ENVIRONMENTAL EFFECTS TO USER INTERACTIONS USING AUTOMATED SHOPPING CARTS

(71) Applicant: Maplebear Inc., San Francisco, CA (US)

(72) Inventor: Leho Nigul, Aurora (CA)

(73) Assignee: Maplebear Inc., San Francisco, CA (US)

( * ) Notice: Subject to any disclaimer, the term of this patent is extended or adjusted under 35 U.S.C. 154(b) by 71 days.

(21) Appl. No.: 18/350,202

(22) Filed: Jul. 11, 2023

(65) Prior Publication Data

US 2025/0022003 A1 Jan. 16, 2025

(51) Int. Cl.
*G06Q 30/0204* (2023.01)

(52) U.S. Cl.
CPC ................. *G06Q 30/0205* (2013.01)

(58) Field of Classification Search
CPC .................................................. G06Q 30/0205
See application file for complete search history.

(56) References Cited

U.S. PATENT DOCUMENTS

| 6,831,663 B2* | 12/2004 | Chickering | G06Q 10/02 |
| | | | 707/999.102 |
| 2008/0230603 A1* | 9/2008 | Stawar | G06Q 30/04 |
| | | | 235/383 |
| 2012/0191531 A1* | 7/2012 | You | G06F 16/958 |
| | | | 705/14.42 |
| 2016/0109954 A1* | 4/2016 | Harris | G06V 20/20 |
| | | | 345/156 |
| 2018/0240554 A1* | 8/2018 | Vasgaard | A61B 5/6887 |
| 2018/0285896 A1* | 10/2018 | Deluca | G06Q 30/0201 |
| 2018/0300788 A1* | 10/2018 | Mattingly | G06Q 30/0625 |
| 2020/0060007 A1* | 2/2020 | Harrison | H05B 47/105 |

(Continued)

OTHER PUBLICATIONS

An experimental approach to making retail store environmental decisions. Baker, Julie; Levy, Michael; Grewal, Dhruv. Journal of Retailing 68.4: 445. Greenwich: Elsevier Limited. (Winter 1992).*

(Continued)

*Primary Examiner* — Timothy Padot
(74) *Attorney, Agent, or Firm* — Fenwick & West LLP (57) ABSTRACT

An automated checkout system applies environmental effects to physical regions within a store. The automated checkout system logs the environmental effect, a time the environmental effect was applied, and the physical region to which the environmental effect was applied. The automated checkout system detects an interaction event and logs a time associated with the interaction event. The automated checkout system identifies a location of the automated shopping cart and identifies a physical region within the store that contains the automated shopping cart's location. The automated checkout system identifies the environmental effect that was applied to the physical region at the time of the interaction event and generates a data point. For each environmental effect, the automated checkout system computes a success metric based on the generated data points. The automated checkout system applies environmental effects to physical regions based on the success metrics.

20 Claims, 4 Drawing Sheets

(56) References Cited

U.S. PATENT DOCUMENTS

2023/0143479 A1* 5/2023 Hagen ................... G06T 7/11
                                                                                    345/420

OTHER PUBLICATIONS

Instacart Announces 'Connected Stores' Technology to Help Grocers Seamlessly Unify the Online and In-Store Shopping Experience for Consumers. PR Newswire [New York] Sep. 19, 2022.*
Lighting in the retail environment. Morin, Michelle. Chain Store Age 74.6: 134. EnsembleIQ. (Jun. 1998).*
Sobeys pilots Smart Cart, the first intelligent grocery shopping cart. Canada NewsWire [Ottawa] Oct. 23, 2019.*
D. A. Mora Hernandez et al., "How Computer Vision Provides Physical Retail with a Better View on Customers," 2019 IEEE 21st Conference on Business Informatics (CBI), Moscow, Russia, 2019, pp. 462-471.*
M. A. Sarwar et al., "Smart Shopping Carts Based on Mobile Computing and Deep Learning Cloud Services," 2020 IEEE Wireless Communications and Networking Conference (WCNC), Seoul, Korea (South), 2020, pp. 1-6.*

* cited by examiner

RELATING ENVIRONMENTAL EFFECTS TO USER INTERACTIONS USING AUTOMATED SHOPPING CARTS

BACKGROUND

Users interact with items in their environment based on characteristics of the user's environment. For example, a user may prefer to sit in one portion of a room over another based on the lighting in that portion. Operators of areas in which users interact with items may manipulate the environmental conditions of their areas with artificial effects. For example, an operator may change the color of the lighting so that the lighting is warmer to encourage users to relax within their spaces or may play music within the environment so that the environment feels more welcoming or casual to users.

However, there are challenges with testing the impact of environmental conditions on user interactions with items in those environments. External factors such as weather, time of day, or season, may impact how user interaction rates with items change based on environmental conditions. For example, if weather on one day is particularly cold, users may interact with more items within a room when the room is lit with warm lighting than when it is lit with cool lighting. To account for these factors while testing an environmental condition, an operator may apply a test condition and a control condition within an environment at the same time. The operator can thereby compute the impact of the test condition on user interaction rates based on the difference in user interaction rates within areas that were applied with the test environmental condition versus the control environmental condition. However, operators traditionally cannot effectively measure which environmental condition was applied at a time for a user while the user is interacting with items. For example, if a store is testing the impacts of lighting conditions on their produce section, it may be difficult for store operators to measure user interaction rates with items in the store until the user checks out from the store. Thus, dynamic testing of environmental conditions within an area is generally impractical or impossible to perform.

SUMMARY

In accordance with one or more aspects of the disclosure, an automated checkout system determines the efficacy of applied environmental effects to encourage user interactions within a store by generating data points based on user interaction events within the store. An environmental effect is an artificial modification to the store environment that a user in the store may experience. Example environmental effects include lighting conditions (e.g., of a particular brightness, hue, or pattern), temperature conditions (e.g., warm or cold), sound conditions (e.g., music, frequencies), or even scent conditions (e.g., lavender scent). To test an experimental environmental effect's impact on user interactions, the automated checkout system applies environmental effects to physical regions within the store over a time period. These applied environmental effects include the experimental environmental effect and a control environmental effect. Thus, the automated checkout system can compare the rate of user interactions within the store when each environmental effect is applied and can thereby determine the efficacy of the experimental environmental effect as compared to the control environmental effect. For example, from 10:00 am to 10:15 am, the automated checkout system may apply an experimental environmental effect of a high brightness lighting condition to a first half of the store and apply a control environmental effect of neutral brightness lighting condition to a second half of the store. From 10:15 am to 10:30 am, the automated checkout system may switch where the control and experimental environmental effects are applied by applying the control environmental effect to the first half of the store and the experimental environmental effect to the second half of the store.

To determine user interaction rates during the different environmental effects, the automated checkout system uses automated shopping carts to monitor a user's location within the store and determine the environmental effect that the user was experiencing when they interacted with content in the store. For example, the automated checkout system may detect a user interaction event through sensor data from the user's shopping cart and log an entry in an event log. An entry may include the interaction and a time associated with the interaction event. The automated checkout system identifies a location of the automated shopping cart when the user interaction event occurred and identifies a physical region within the store that contains the automated shopping cart's location. The automated checkout system thereby identifies the environmental effect that was applied to the physical region at the time of the user interaction event based on an effect log that stores when environmental effects were applied and to which regions they were applied. The automated checkout system generates a set of data points based on the user interaction events and computes a success metric for the environmental effects that were applied within the store based on the generated data points. The automated checkout system can use this success metric to determine which environmental effects to apply to physical regions within the store.

By using shopping cart sensor data, the automated checkout system can more easily correlate user interactions with environmental effects. This enables the automated checkout system to apply more complex arrangements of environmental effects, such as more frequent, randomized changes in environmental effects that may neutralize the impact of external effects, all the while still effectively keeping track of which users experience which environmental effects.

DETAILED DESCRIPTION

Example System Environment for Automated Checkout System

Figure 1:
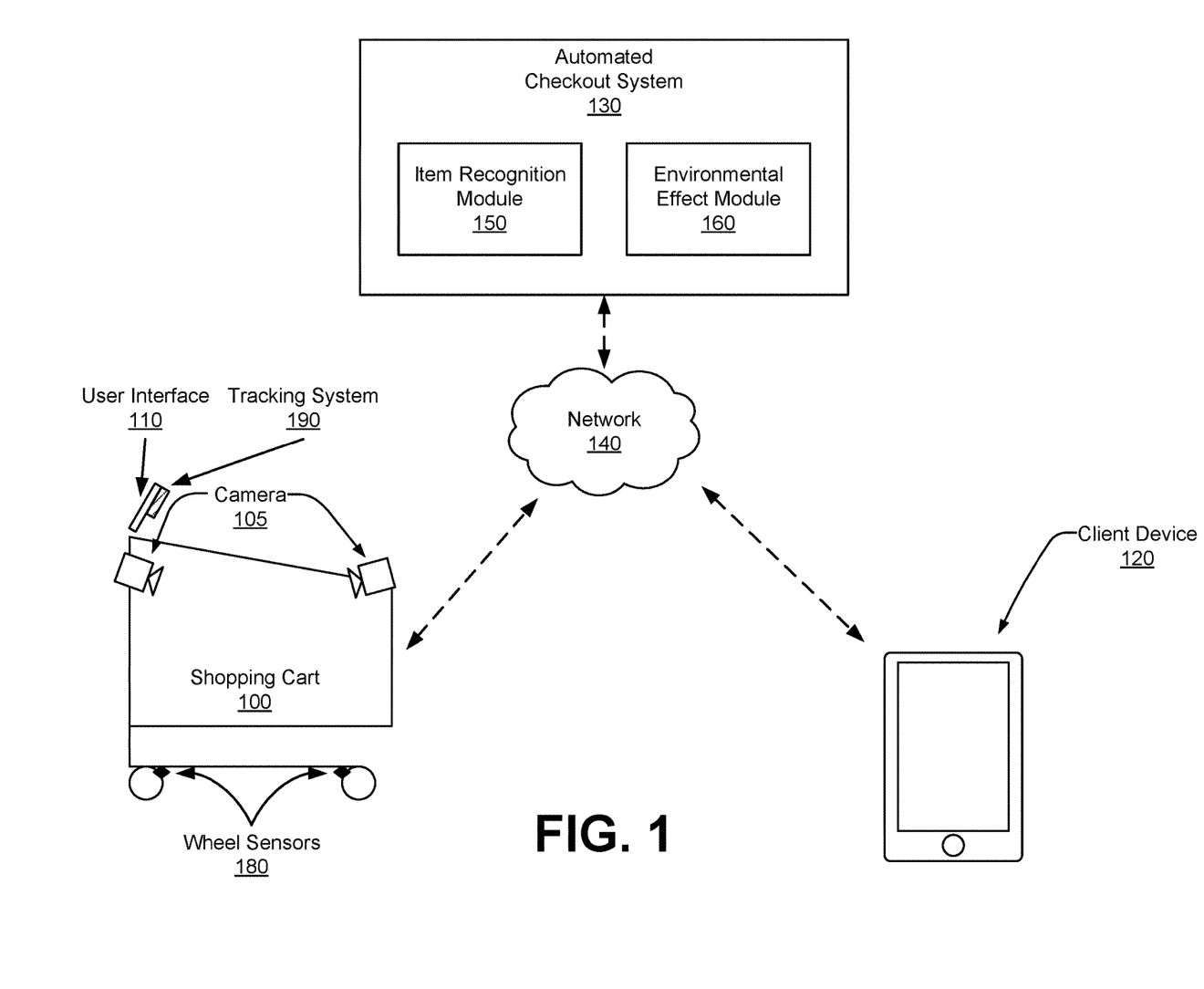
FIG. 1 illustrates an example system environment for an automated checkout system, in accordance with one or more embodiments.

FIG. 1 illustrates an example system environment for an automated checkout system, in accordance with one or more embodiments. The system environment illustrated in FIG. 1 includes a shopping cart 100, a client device 120, an automated checkout system 130, and a network 140. Alternative embodiments may include more, fewer, or different components from those illustrated in FIG. 1, and the functionality of each component may be divided between the components differently from the description below. For example, functionality described below as being performed by the shopping cart may be performed, in one or more embodiments, by the automated checkout system 130 or the client device 120. Similarly, functionality described below as being performed by the automated checkout system 130 may, in one or more embodiments, be performed by the shopping cart 100 or the client device 120. Additionally, each component may perform their respective functionalities in response to a request from a human, or automatically without human intervention.

A shopping cart 100 is a vessel that a user can use to hold items as the user travels through a store. The shopping cart 100 includes one or more cameras 105 that capture image data of the shopping cart's storage area and a user interface 110 that the user can use to interact with the shopping cart 100. The shopping cart 100 may include additional components not pictured in FIG. 1, such as processors, computer-readable media, power sources (e.g., batteries), network adapters, or sensors (e.g., load sensors, thermometers, proximity sensors). The shopping cart may also be referred to herein as an "automated shopping cart."

The cameras 105 capture image data of the shopping cart's storage area. The cameras 105 may capture two-dimensional or three-dimensional images of the shopping cart's contents. The cameras 105 are coupled to the shopping cart 100 such that the cameras 105 capture image data of the storage area from different perspectives. Thus, items in the shopping cart 100 are less likely to be overlapping in all camera perspectives. In one or more embodiments, the cameras 105 include embedded processing capabilities to process image data captured by the cameras 105. For example, the cameras 105 may be Mobile Industry Processor Interface (MIPI) cameras.

The shopping cart 100 may include one or more sensors (not shown) that capture measurements describing the shopping cart 100, items in the shopping cart's storage area, or the area around the shopping cart 100. For example, the shopping cart 100 may include load sensors that measure the weight of items placed in the shopping cart's storage area. Similarly, the shopping cart 100 may include proximity sensors that capture measurements for detecting when an item is being added to the shopping cart 100. The shopping cart 100 may transmit data from the one or more sensors to the automated checkout system 130.

In one or more embodiments, the shopping cart 100 captures image data in response to detecting that an item is being added to the storage area. The shopping cart 100 may detect that an item is being added based on sensor data from sensors on the shopping cart 100. For example, the shopping cart 100 may detect that a new item has been added when the shopping cart 100 detects a change in the overall weight of the contents of the storage area based on load data from load sensors. Similarly, the shopping cart 100 may detect that a new item is being added based on proximity data from proximity sensors indicating that something is approaching the storage area of the shopping cart 100. The shopping cart 100 captures image data within a timeframe near when the shopping cart 100 detects a new item. For example, the shopping cart 100 may activate the cameras 105 and store image data in response to detecting that an item is being added to the shopping cart 100 and for some period of time after that detection.

The shopping cart 100 includes a user interface 110 through which the user can interact with the automated checkout system 130. The user interface 110 may include a display, a speaker, a microphone, a keypad, or a payment system (e.g., a credit card reader). The user interface 110 may allow the user to adjust the items in their shopping list or to provide payment information for a checkout process. Additionally, the user interface 110 may display a map of the store indicating where items are located within the store. In one or more embodiments, a user may interact with the user interface 110 to search for items within the store, and the user interface 110 may provide a real-time navigation interface for the user to travel from their current location to an item within the store. The user interface 110 also may display additional content to a user, such as suggested recipes or items for purchase.

A user can also interact with the shopping cart 100 or the automated checkout system 130 through a client device 120. The client device 120 can be a personal or mobile computing device, such as a smartphone, a tablet, a laptop computer, or desktop computer. In one or more embodiments, the client device 120 executes a client application that uses an application programming interface (API) to communicate with the automated checkout system 130 through the network 140.

The shopping cart 100 includes one or more wheel sensors 180 that measure wheel motion data of the one or more wheels. The wheel sensors 180 may be coupled to one or more of the wheels on the shopping cart. In one or more embodiments, a shopping cart 100 includes at least two wheels (e.g., four wheels in the majority of shopping carts) with two wheel sensors coupled to two wheels. In further embodiments, the two wheels coupled to the wheel sensors can rotate about an axis parallel to the ground and can orient about an axis orthogonal or perpendicular to the ground. In other embodiments, each of the wheels on the shopping cart has a wheel sensor (e.g., four wheel sensors coupled to four wheels). The wheel motion data includes at least rotation of the one or more wheels (e.g., information specifying one or more attributes of the rotation of the one or more wheels). Rotation may be measured as a rotational position, rotational velocity, rotational acceleration, some other measure of rotation, or some combination thereof. Rotation for a wheel is generally measured along an axis parallel to the ground. The wheel rotation may further include orientation of the one or more wheels. Orientation may be measured as an angle along an axis orthogonal or perpendicular to the ground. For example, the wheels are at 0° when the shopping cart is moving straight and forward along an axis running through the front and the back of the shopping cart. Each wheel sensor 180 may be a rotary encoder, a magnetometer with a magnet coupled to the wheel, an imaging device for capturing one or more features on the wheel, some other type of sensor capable of measuring wheel motion data, or some combination thereof.

The shopping cart 100 includes a tracking system 190 configured to track a position, an orientation, movement, or some combination thereof of the shopping cart 100 in an indoor environment. The tracking system 190 may be a computing system comprising at least one processor and computer memory. The tracking system 190 may further include other sensors capable of capturing data useful for determining position, orientation, movement, or some combination thereof of the shopping cart 100. Other example sensors include, but are not limited to, an accelerometer, a gyroscope, etc. The tracking system 190 may provide real-time location of the shopping cart 100 to an online system and/or database. The location of the shopping cart 100 may inform content to be displayed by the user interface 110. For example, if the shopping cart 100 is located in one aisle, the display can provide navigational instructions to a user to navigate them to a product in the aisle. In other example use cases, the display can provide suggested products or items located in the aisle based on the user's location.

International Application No. PCT/CN2022/102796, filed Jun. 30, 2022, describes wheel sensors 180 and the tracking system 190 in more detail and is incorporated by reference herein in its entirety.

The client device 120 may allow the user to add items to a shopping list and to checkout through the automated checkout system 130. For example, the user may use the client device 120 to capture image data of items that the user is selecting for purchase, and the client device 120 may provide the image data to the automated checkout system 130 to identify the items that the user is selecting. The client device 120 adjust the user's shopping list based on the identified item. In one or more embodiments, the user can also manually adjust their shopping list through the client device 120.

The shopping cart 100 and client device 120 can communicate with the automated checkout system 130 via a network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, or 5G spectra), or satellites. The network 140 also may use networking protocols, such as TCP/IP, HTTP, SSH, SMS, or FTP, to transmit data between computing devices. In one or more embodiments, the network 140 may include Bluetooth or near-field communication (NFC) technologies or protocols for local communications between computing devices. The network 140 may transmit encrypted or unencrypted data.

The automated checkout system 130 allows a customer at a brick-and-mortar store to complete a checkout process in which items are scanned and paid for without having to go through a human cashier at a point-of-sale station. The automated checkout system 130 receives data describing a user's shopping trip in a store and generates a shopping list based on items that the user has selected. For example, the automated checkout system 130 may receive image data from a shopping cart 100 and may determine, based on the image data, which items the user has added to their cart. When the user indicates that they are done shopping at the store, the automated checkout system 130 facilitates a transaction between the user and the store for the user to purchase their selected items. As noted above, while the automated checkout system 130 is depicted in FIG. 1 as separate from the shopping cart 100 and the client device 120, some or all of the functionality of the automated checkout system 130 may be performed by the shopping cart 100 or the client device 120, and vice versa.

The automated checkout system 130 establishes a session for a user to associate the user's actions with the shopping cart 100 to that user. The user may establish the session by inputting a user identifier (e.g., phone number, email address, username, etc.) into a user interface 110 of the shopping cart 100. The user also may establish the session through the client device 120. The user may use a client application operating on the client device 120 to associate the shopping cart 100 with the client device 120. The user may establish the session by inputting a cart identifier for the shopping cart 100 through the client application, e.g., by manually typing an identifier or by scanning a barcode or QR code on the shopping cart 100 using the client device 120. In one or more embodiments, the automated checkout system 130 establishes a session between a user and a shopping cart 100 automatically based on sensor data from the shopping cart 100 or the client device 120. For example, the automated checkout system 130 may determine that the client device 120 and the shopping cart 100 are in proximity to one another for an extended period of time, and thus may determine that the user associated with the client device 120 is using the shopping cart 100. In some embodiments, in establishing a session, the automated checkout system 130 may receive or store user attributes. For example, if the user establishes a session using a username to an account, the automated checkout system may receive and store user attributes associated with the account. Example user attributes include demographic information and purchase history. The automated checkout system 130 may also receive and store a wish list, a list of items that the user plans on shopping for and purchasing ahead of establishing the session.

The automated checkout system 130 generates a shopping list for the user as the user adds items to the shopping cart 100. The shopping list is a list of items that the user has gathered that the user intends to purchase. The shopping list may include identifiers for the items that the user has gathered (e.g., SKUs) and a quantity for each item. As illustrated in FIG. 1, the automated checkout system 130 comprises an item recognition module 150, which identifies items that the user places in their shopping cart. To generate the shopping list, the item recognition mode 150 analyzes image data captured by the cameras 105 on the shopping cart 100. For example, the automated checkout system 130 may apply a machine-learning model (e.g., a neural network) to image data from the shopping cart 100 to identify an item added to the cart.

In one or more embodiments, the item recognition module 150 uses a barcode detection model to identify items in the shopping cart's storage area. A barcode detection model is a machine-learning model that is trained to identify items by identifying barcodes on the items based on image data from the cameras 105. The barcode detection model identifies portions of the image data that correspond to a barcode on an item and determines the item identifier (e.g., SKU) that is represented by the barcode.

In other embodiments, the item recognition module 150 uses an image recognition model to identify items in the shopping cart's storage area. The image recognition model is a machine-learning model that is trained to identify items based on visual characteristics of the items captured in the image data from the cameras 105. The image recognition model identifies portions of the image that correspond to each item and matches the item to a candidate item within the store. The item recognition module 150 may additionally filter candidate items within the store based on the location of the shopping cart within the store and a known or anticipated location of each candidate item within the store. The tracking system 190 determines the location of the shopping cart within the store as described above.

The automated checkout system 130 facilitates a checkout by the user through the shopping cart 100. The automated checkout system 130 computes a total cost to the user of the items in the user's shopping list and charges the user for the cost. The automated checkout system 130 may receive payment information from the shopping cart 100 and uses that payment information to charge the user for the items. Alternatively, the automated checkout system 130 may store payment information for the user in user data describing characteristics of the user. The automated checkout system 130 may use the stored payment information as default payment information for the user and charge the user for the cost of the items based on that stored payment information.

The automated checkout system 130 also comprises an environmental effect module 160, as shown in FIG. 1. The environmental effect module 160 applies environmental effects to physical regions within a store. The environmental effect module 160 logs the environmental effects, generates data points, and uses the data points to compute success metrics for the effects. The environmental effect module 160 may then apply environmental effects to physical regions based on the success metrics.

In some embodiments, a user who interacts with the shopping cart 100 or the client device 120 may be a shopper for an online concierge system. The shopper is a user who collects items from a store on behalf of a user of the online concierge system. For example, a user may submit a list of items that they would like to purchase. The online concierge system may transmit that list to a shopping cart 100 or a client device 120 used by a shopper. The shopper may use the shopping cart 100 or the client device 120 to add items to the user's shopping list. When the shopper has gathered the items that the user has requested, the shopper may perform a checkout process through the shopping cart 100 or client device 120 to charge the user for the items. U.S. Pat. No. 11,195,222, entitled "Determining Recommended Items for a Shopping List," issued Dec. 7, 2021, describes online concierge systems in more detail, which is incorporated by reference herein in its entirety.

Example Item Recognition Module

Figure 2A:
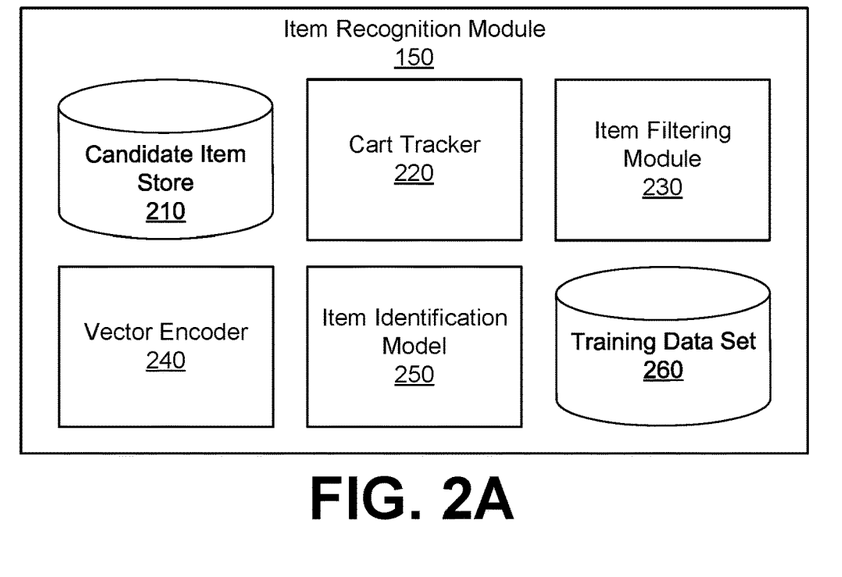
FIG. 2A illustrates an example system architecture for an item recognition module, in accordance with one or more embodiments.

The item recognition module 150 implements a machine-learning model to identify an item placed in a shopping cart 100 based on images of the item captured by the cameras 105 and the location of the shopping cart 100 within the store. The item recognition module 150 inputs the captured images to the machine-learning model, which identifies the item from a set of candidate items. As described above, the tracking system 190 tracks the location of the shopping cart 100 within the store. The item recognition module 150 identifies the set of candidate items based on the location of the shopping cart 100 within the store. For example, the item recognition module 150 narrows down items within the store to a set of candidate items located within a threshold distance of the shopping cart 100.

FIG. 2A illustrates an example system architecture for an item recognition module 150, in accordance with one or more embodiments. The item recognition module 150 includes a candidate item store 210, a cart tracker 220, an item filtering module 230, a vector encoder 240, an item identification model 250, and a training data set 260. Alternative embodiments may include more, fewer, or different components from those illustrated in FIG. 2A, and the functionality of each component may be divided between the components differently from the description below. Additionally, the item recognition module 150 illustrated in FIG. 2A may be the same item recognition module 150 illustrated in FIG. 1.

The candidate item store 210 maintains a record of each item available within a store. Each item is labeled with a unique identifier of the item and a location of the item within the store. The candidate item store 210 may also store one or more images of the item labeled with the unique identifier of the item and a known location of the item within the store. For example, where the item is a particular bag of chips, the candidate item store 210 stores one or more images of that particular bag of chips with a label comprising a unique identifier for that particular bag of chips and the aisle of the store where that particular bag of chips may be found. In one or more embodiments, the candidate item store 210 may additionally store features of an item extracted from labeled images of the item (e.g., color, shape, texture, etc.). Depending on the inventory preferences of a store, the candidate item store 210 may define items at varying levels of granularity. For example, the candidate item store 210 assigns different brands of the same item (e.g., different brands of potato chip) different unique identifiers and relates the unique identifier to images of the particular brand of item and the location of the particular brand of item. As another example, one brand may offer different sizes or varieties of the same item. Accordingly, the candidate item store 210 assigns each size or variety of the item (e.g., different sized bags of the same brand of potato chip) a unique identifier and relates the unique identifier to images of the particular variety and the location of the particular variety.

Information within the candidate item store 210 may be stored in lookup tables indexed by unique identifiers. For example, each row of the lookup table may include the unique identifier of an item, labeled images of the item, features extracted from the labeled images of the item, the location of item within the store, or a combination thereof. The candidate item store 210 may be updated at periodic intervals or in response to a trigger event, for example a new image of an item captured by the cameras 105. Such periodic updates ensure that the candidate item store 210 stores the most recent (or updated) images of a content and reflect the most up-to-date offerings within the store.

The cart tracker 220 accesses the real-time location of the shopping cart 100, which the tracking system 190 determines using a self-tracking algorithm to continuously track the location of the shopping cart 100. The tracking system 190 may maintain a locally stored map of the indoor environment. The tracking system 190 may receive information on the layout of the indoor environment, e.g., placement of shelves, tables, automated checkout systems, external wireless devices, etc. Upon self-tracking, the tracking system 190 may update its real-time location on the locally stored map. At some frequency, the tracking system 190 may synchronize with an online system storing a global map to provide updates on the location of the shopping cart 100. The online system may further communicate updated information on the layout of the indoor environment, e.g., if fixtures move, or if some checkout lanes close, etc. The tracking system 190 may broadcast an interrogation pulse into the indoor environment of the store. The interrogation pulse triggers wireless devices positioned around the indoor environment to provide response signals. The tracking system 190 may determine a location of the shopping cart 100 based on the response signals. In one or more embodiments, the tracking system 190 may calculate distances between the shopping cart 100 and the various wireless devices to triangulate the location of the shopping cart 100.

In one or more embodiments, the tracking system 190 continuously updates the location of the shopping cart 100 and the cart tracker 220 accesses the current location of the shopping cart 100. In other embodiments, the tracking system 190 updates the location of the shopping cart 100 at periodic intervals and the cart tracker 220 accesses the most recent location of the shopping cart 100. In other embodiments, the tracking system 190 updates the location of the shopping cart 100 in response to a request from the cart tracker 220 or another trigger event and the cart tracker 220 accesses the most recent location of the shopping cart 100.

As a starting point, when the cameras 105 capture an image of an item(s) in a shopping cart 100, the item identification model 250 considers every item in the store to identify the item in the image. However, for larger stores with a vast array of items, the recognition process can be time-consuming and require significant processing capacity. However, the location of the shopping cart 100 within the store informs the items that a user is most likely to place in their shopping cart 100. For example, if the shopping cart 100 is located in the fruit aisle, it is more likely that an item placed in the shopping cart 100 is a fruit than a canned good. Accordingly, the item filtering module 230 considers the location within the shopping cart 100 (accessed by cart tracker 220). The item identification model 250 identifies items within the cart in a computationally more efficient manner by first comparing the item in the cart to a filtered set of candidate items in proximity to the shopping cart. The item identification model 250 is further described below.

In a first implementation, the item filtering module 230 filters out any items in the candidate item store 210 that are located beyond a threshold distance from the shopping cart. Accordingly, the item filtering module 230 identifies a subset of candidate items within the threshold distance of the shopping cart 100. When determining the threshold distance, the item filtering module 230 may consider various factors including the length of the aisle, the number of items in the aisle, the overall size of the store, the overall number of items within the store, the frequency with which users select items from the aisle, the frequency with which users select particular items and the location of the particular items within the aisle, or any other suitable factor.

In one or more embodiments, the item filtering module 230 may extend radii satisfying the threshold distance in all directions from the center of the shopping cart and filter out any candidate item in the store beyond the radii. Each of the radii may not exceed the threshold distance such that the radii define a boundary around the shopping cart. The item filtering module 230 adds all items within the boundary to the subset of candidate items and excludes all items beyond the boundary from the subset of candidate items.

In another embodiment, the item filtering module 230 defines the threshold distance as a function of the location of the shopping cart 100 relative to the aisle. The item filtering module 230 may define the threshold distance based on the distance from the center of the shopping cart to either end of the aisle. The item filtering module 230 may define multiple radii extending from the center of the shopping cart at different lengths such that all items in the aisle are included in the subset of candidate items. For example, where the shopping cart is located in the middle of an aisle, the item filtering module 230 may extend the two longest radii to each end of the aisle with smaller radii extending to sections of the aisle between the two ends.

The item filtering module 230 may dynamically adjust the boundary around the shopping cart by adjusting the length of one or more radii as the shopping cart moves up and down the aisle. For example, as the shopping cart moves from the middle of the aisle to the left end of the aisle, the item filtering module 230 reduces the length of radii extending toward the left end and increases the length of radii extending toward the right end. In one or more embodiments, the item filtering module 230 may define a threshold distance that extends only part way down either side of the aisle.

Additionally, where the shopping cart 100 is located between two parallel aisles (e.g., aisles on both sides of the shopping cart), the item filtering module 230 applies a first set of radii extending from the shopping cart 100 along the right aisle and a second pair of radii extending from the shopping cart 100 along the left aisle. The item filtering module 230 dynamically adjusts each pair of radii as the shopping cart 100 moves up and down an aisle in the manner described above.

The item filtering module 230 determines the set of candidate items by identifying items within the boundary around the shopping cart. The item filtering module 230 identifies items within the boundary of the shopping cart using an item map of the store. The item map identifies the locations within the store where items are displayed for collection by users or shoppers in the store. The item map stores the location of items in the store in a two-dimensional plane representing the floor of the store. The item map can also store item locations in a third dimension. For example, the item map may indicate on which level of a set of shelves an item is displayed. In one or more embodiments, the item map is a planogram specifying where items should be displayed in the store. The item filtering module 230 (and more generally the automated checkout system 130) uses the location of the shopping cart and the item map to determine which items are located within the boundary defined for the shopping cart.

In one or more embodiments, the item placed in the shopping cart 100 may not be selected from the items within the threshold radius of the shopping cart. Consider a user who leaves their shopping cart between two cereal aisles to select a carton of milk from a different aisle outside the threshold radius before returning to the shopping cart in the cereal aisle. The carton of milk is not a candidate item within a boundary of the shopping cart because the carton of milk is not located in either of the cereal aisles. Accordingly, the item identification model 250 will not find a match between the carton of milk and any of the filtered subset of candidate items. In such embodiments, the item filtering module 230 may extend the boundary of the shopping cart 100 to cover the next adjacent aisle on one or both sides. The item filtering module 230 may iterate this process until the filtered subset of candidate items includes the matching items.

The candidate item store 210 may store relationships between items in a store that are frequently bought together or items that are known to be related to each other. For example, the candidate item store 210 may store a relationship that milk is often bought with cereal, chips are often bought with salsa, or spaghetti is often bought with meatballs. The item filtering module 230 may supplement the filtered subset of candidate items by adding secondary items according to the relationships stored in the candidate item store. Returning to the above example of a user in the cereal aisle, the item filtering module 230 may add various milk to the filtered subset of candidate items given the relationship between milk and cereal. Relationships between items may be defined or assigned manually by an operator or extracted from historical data including shopping lists and checkouts from previous users.

In a second implementation, the item filtering module 230 may consider the distance between each item in the store and the shopping cart 100. In one or more embodiments, the candidate item store 210 stores the location of each item in a coordinate space representing the store, for example the item map. The item filtering module 230 determines a distance between the coordinate location of the item and the location of the shopping cart 100 within the coordinate space representing the store. In one or more embodiments, the item filtering module 230 determines the distance between the location of the item and the location of the shopping cart 100 without considering the layout of the store. In other embodiments, the item filtering module 230 determines the distance between the location of item and the location of the shopping cart 100 while considering the layout of the store. The item filtering module 230 may access the map of the store implemented by the tracking system 190 to identify paths that a user could actually take from the shopping cart 100 to the item (e.g., actual walkways) and determine the distance of the shortest path.

The item filtering module 230 may assign items to tiers based on the distance between each item and the shopping cart 100 such that each tier represents a range of distances. The item filtering module 230 may rank each tier in order of closest distances to farthest. When identifying an item in the shopping cart 100, the item identification model 250 first considers candidate items in the tier representing the closest distances. If a match is not found within that batch, the item filtering module 230 may iterate through each tier in order of increasing distances until the item identification model 250 identifies a matching candidate item.

In other embodiments, the item filtering module 230 only provides the tier of the closest candidate items to the item identification model 250. If the item identification model 250 does not find a match between an item in the shopping cart 100 and the tier of the closest candidate items, the item filtering module 230 may supplement the tier with additional items based on relationships between items stored in the candidate item store 210 as discussed above.

In a third implementation, the item filtering module 230 ranks every item in the store based on the distance between the item and the shopping cart, such that the closer the item to the cart the higher the item is ranked. The item filtering module 230 ranks all items within the store according to their distance from the shopping cart 100 and identifies candidate items as those ranked above a threshold ranking. When input to the item identification model 250, the item identification module 250 may sequentially compare an item to each candidate item in the store in order from highest ranked item to lowest ranked item (e.g., the closest item to the farthest item) until a match is found.

The item identification model 250 analyzes features extracted from an image to identify an item in the image, for example by matching features of the item to features of a candidate item stored in the store 210. Accordingly, the vector encoder 240 extracts visual features of the item from the image and encodes the extracted features into a format to be input to the item identification model 250, for example a feature vector (also referred to as a "component vector"). The vector encoder 240 receives features of an item extracted from an image and generates a feature vector from the extracted features. As described herein, a feature vector is a representation of the feature data extracted from an image, which may be processed by a machine-learning model (e.g., the item identification model 250) to identify the item within the image.

The vector encoder 240 extracts visual features of an item from an image of the item, for example using an optical character recognition algorithm or any other suitable visual analysis technique. Examples of visual features extracted for an item include, but are not limited to, size of the item, shape of the item, color of the item, etc. The vector encoder 240 encodes a feature vector for the item based on the extracted visual features. Additionally, in one or more embodiments, the vector encoder 240 accesses the location of the shopping cart 100 from the cart tracker 220 and adds a feature representing the location of the shopping cart to the encoded feature vector for the item. As described above, the location of the shopping cart may inform the types of items being placed in the shopping cart. For example, if the shopping cart 100 is located in the produce aisle and an orange spherical item is placed in the cart, encoding the location of the shopping cart 100 into the feature vector of the item may inform the item identification model 250 that the item is an orange rather than a basketball.

As described above, the item recognition module 150 applies machine-learning based techniques to identify an item in an image captured by the cameras 105 based on visual features extracted from the image and/or the location of the shopping cart 100 within the store. In particular, the item identification model 250 analyzes features extracted for the item to determine similarity scores between the item and each candidate item identified by the item filtering module 230. To identify an item, the item identification model 250 may be a mathematical function or other more complex logical structure, trained using a combination of features stored in the training data set 260 to determine a set of parameter values stored in advance and used as part of the identification analysis. As described herein, the term "model" refers to the result of the machine learning training process. Specifically, the item identification model 250 describes the function for identifying an item and the determined parameter values incorporated into the function. "Parameter values" describe the weight associated with at least one of the features of the encoded feature vector.

The item identification model 250 is trained using the training data set 260, which is made up of large volumes of historical features extracted for a number of labeled items. Each entry of the training data set 260 represents an item labeled with a known identification of the item, which may also be referred to as an "identification label." In one or more embodiments, the training data set is specific to a particular store; the training data set 260 may only store labeled features for items available in that particular store. In other embodiments, the training data set includes labeled features for a variety of items including those that are not currently available in the store but may become available in the future. The item recognition module 150 may predict items that may become available in the future based on known relationships between various items, for example as described above. An entry in the training data set 260 may further comprise features of that item, for example the color, shape, size of the item, or any other feature that contributed to the identification label of the item. During training, the item identification module 250 determines parameter values for each feature input to the item identification model 250 by analyzing and recognizing correlations between the features associated with an item and the labeled identification of the item.

As the identifications output by the item identification model 250 are verified by operators associated with the store or customers, the training data set 260 may be continuously updated with entries pertaining to newly listed items. In addition, the training data set 260 may be continuously updated as the appearance of certain items changes, for example changes to logos or packaging of an item. Accordingly, the item identification model 250 may be iteratively trained based on the updated data in the training data set 260 to continuously improve the accuracy of identifications output by the item identification module 250.

In one or more embodiments, entries within the training data set 260 represent items from a range of categories, for example frozen foods, canned goods, juices, etc. The item identification model 250 may be trained on such training data to generate a baseline model for each category. Depending on the location of the shopping cart 100 determined by the cart tracker 220, the item identification model 250 may select a particular baseline model. For example, if the shopping cart 100 is located in the frozen foods section, the item identification model 250 may select the baseline model for frozen foods and input the encoded feature vector to the selected baseline model. In such embodiments, the baseline model may be further trained using a particularized training data set comprising training data for the particular category of items. Accordingly, a baseline item identification model may be further trained to identify a particular category of items.

Periodically, the training data set 260 may be updated with entries of novel items or novel features extracted from items already labeled and stored in the training data set 260. Accordingly, item identification model 250 may be iteratively trained by inputting the features of the existing and novel items such that the model 250 continues to learn and refine its parameter values based on the new and updated data set 260. Iteratively re-training the item identification model 250 in the manner discussed above allows the model 250 to more accurately predict the classification of an item based on the features extracted from an image(s) of the item.

As discussed above, the item identification model 250 outputs an identification for an item captured in an image based on features of the item extracted from the image and the shopping cart itself (e.g., location). In one or more embodiments, the item identification model 250 identifies an item by determining a similarity score between the item and each candidate item identified by the item filtering module 230. The item identification module 250 identifies the item by identifying the candidate item corresponding to the highest similarity score. For example, where a shopping cart 100 is located in the fruit aisle, a user may place a banana (e.g., the item) in the shopping cart. The item identification model 250 may compare the item in the cart to each candidate item identified by the item filtering module 230 and determine a similarity score for each candidate item. Based on features of the item such as its yellow color and shape, the item identification model 250 may determine a higher similarity score between the item and a banana than the item and an orange or any other candidate item. Accordingly, the item identification model 250 identifies the item as a banana. When the item identification model 250 identifies an item, the item recognition module 150 updates the user's shopping list with the item and its identification and displays the updated shopping list to the user.

In one or more embodiments, the item identification model 250 compares the highest similarity score to a threshold score. If the highest similarity score satisfies the threshold score, the item identification model 250 identifies the item based on the candidate item corresponding to the similarity score. If the highest similarity score does not satisfy the threshold score, the item recognition module 150 may further determine a confidence score for its identification. If the features extracted for an item match the features of only one candidate item in the candidate item store 210, the item identification model 250 may determine a confidence score of 100%. Alternatively, if the features extracted for an item only partially match the features of a candidate item or match the features of multiple candidate items, the item identification model 250 may determine a confidence score less than 100%. Accordingly, the item identification model 250 may decrease the confidence score when it identifies multiple candidate items matching an item (e.g., multiple similarity scores within a threshold deviation) or when the item does not match any candidate items. For example, if the vector encoder 240 extracts features characterizing an item in an image as red and in the produce aisle, the item identification model 250 may identify the item as either an apple or a tomato. The item identification model 250 may further determine a confidence score for both candidate items—the apple and the tomato.

When the item identification model 250 determines multiple matches for an item (or determines a confidence score less than 100%), the item recognition module 150 may request user feedback via the user interface 110, for example a request for the user to confirm the identity of the item. In one or more embodiments, the item recognition module 150 may present all the identified candidate items to the user in a single display with a request for the user to select the correct candidate item.

In another embodiment, the item identification module 250 ranks the identified candidate items based on the confidence score determined for each candidate item. The item recognition module 150 may present only the highest ranked candidate item to the user via the user interface 110 with a request for the user to confirm the identity of the item. If the user confirms the identity of the item, the item recognition module 150 updates both the training data set 260 and the candidate item store 210 with the extracted features of the item and the confirmed identity of the item. If the user indicates that the identification of the item is wrong, the item recognition module 150 presents the next highest ranked candidate item to the user via the user interface 110 and again requests confirmation. The item recognition module 150 iterates through the ranked list of candidate items until the user confirms the identification of the item. If the user does not confirm any of the candidate items, the item recognition module 150 may request the user manually identify the novel item using the interface 110 and update the candidate item store 210 and training data set 260 with the novel item. In other embodiments, the item recognition module 150 may request the user manually identify the item using the interface 110 if the highest ranked candidate item does not match the item.

Example Environmental Effect Module

Figure 2B:
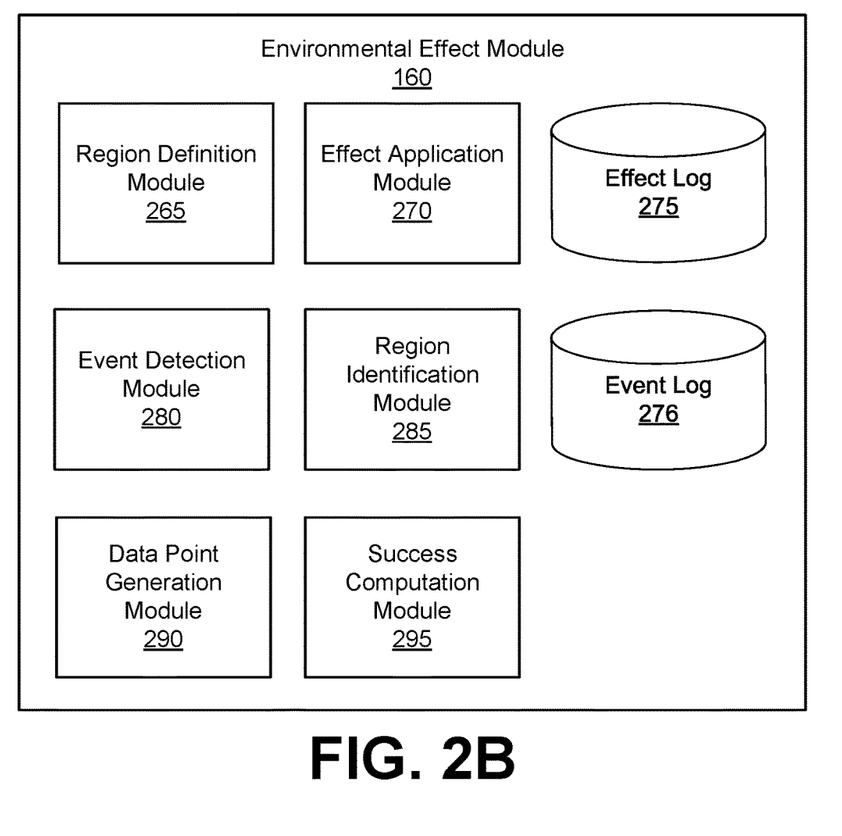
FIG. 2B illustrates an example system architecture for an environmental effect module, in accordance with one or more embodiments.

The environmental effect module 160 applies environmental effects to physical regions within a store. The environmental effect module 160 logs the environmental effects, generates data points, and uses the data points to compute success metrics for the effects. The environmental effect module 160 may then apply environmental effects to physical regions based on the success metrics.

FIG. 2B illustrates an example system architecture for an environmental effect module 160, in accordance with one or more embodiments. The environmental effect module 160 includes a region definition module 265, an effect application module 270, an event detection module 280, a region identification module 285, a data point generation module 290, a success computation module 295, an effect log 275, and an event log 276. Alternative embodiments may include more, fewer, or different components from those illustrated in FIG. 2B, and the functionality of each component may be divided between the components differently from the description below. Additionally, the environmental effect module 160 illustrated in FIG. 2B may be the same environmental effect module 160 illustrated in FIG. 1.

The region definition module 265 defines physical regions within a store. A physical region represents a physical space within the store. These physical regions may be defined based on the items that are located within the physical spaces. For example, if the store is a grocery store, physical regions may be sections (e.g., produce, dairy, frozen), aisles (e.g., frozen dessert), or parts of aisles (e.g., vegan frozen desserts). The region definition module 265 may alternatively define the physical regions by dividing the store into relatively evenly sized regions (e.g., into 10'×10' regions). In one example, the region definition module 265 may define physical regions as regions received from a store operator or manager. In another example, the region definition module 265 may define physical regions based on an item map (e.g., a planogram) of the store. In some embodiments, the region definition module 265 may define the physical regions based on resources within available to apply the environmental effect. For example, if the effect application module 270 is to apply environmental effects that are lighting conditions, the region definition module 265 may define physical regions based on the locations of overhead lights.

The effect application module 270 applies environmental effects to physical regions within a store. An environmental effect is an artificial modification to the physical region's environment that a user within the physical region of the store may experience. For example, the environmental effect may be a lighting condition (e.g., of a particular brightness, hue, or pattern), a temperature condition (e.g., warm or cold), a sound condition (e.g., music, frequencies), a scent condition (e.g., lavender scent), a combination of conditions (e.g., warm with low light), or any other type of environmental effect. The effect application module 270 may apply the effect directly or may communicate with the shopping cart 100, the client device 120, the user interface 110, or the store operator to apply the environmental effects.

The effect application module 270 may apply the same environmental effect to each physical region, such as simultaneously applying consistent bright lighting across all physical regions of a store or may apply different effects to different physical regions. For example, the effect application module 270 may apply warm-toned light in a physical region that encompasses a bakery section of a grocery store and cool-toned light in a physical region that encompasses a frozen section of a grocery store.

In some embodiments, the effect application module 270 may apply one of an experimental environmental effect or a control environmental effect to each physical region. For example, the effect application module 270 may apply, to an aisle of a grocery store, an experimental environmental effect of warm-toned lighting. Simultaneously, to the other aisles of the grocery store, the effect application module 270 may apply a control environmental effect, such as applying the lighting usually applied to the space.

The effect application module 270 may apply environmental effects over a testing time period. A testing time period is a period of time for which an experiment may run (e.g., an hour, day, week, etc.). During the testing time period, the effect application module 270 may vary the environmental effects applied to each region. For example, the effect application module 270 may change the lighting at periodic time intervals or at random time intervals over the course of the testing time period. In the context of an experiment, the effect application module 270 may frequently and randomly change lighting in an effort to cancel out other factors that affect lighting or a user's shopping experience, for example the time of day.

The effect application module 270 logs applied environmental effects by generating entries in an effect log 275. The effect log 275 is a table or database including entries describing the environmental effects applied in the store. An entry may include the applied environmental effect, whether the environmental effect is an experimental or control environmental effect, a time at which the effect application module 270 applied the environmental effect (e.g., a timestamp), and a physical region to which the effect application module 270 applied the effect. In some embodiments, the effect application module 270 may represent the physical region in the entry as a set of coordinates defining the bounds of the physical region on a global or locally stored map. The effect application module 270 generates entries periodically or responsive to changing the effect. As an example, the effect application module 270 may generate a first entry the environmental effect of warm-toned lighting was applied to the bakery section (a 12-foot by 6-foot region) at 5:00 pm and generate a second entry that the environmental effect of cool-toned lighting was applied to the frozen dessert section (a 40 foot by 12 foot region) at 5:00 pm.

The event detection module 280 detects an occurrence of an interaction event performed by a user. An interaction event is an indication that the user has interacted with an item in the store. For example, the interaction event may be the user adding an item to the shopping cart 100, the user picking an item off a shelf, the user removing an item from the shopping cart 100, or the user placing an item back on a shelf. The interaction event may include an item with which the user interacted (e.g., an item added to the shopping cart 100).

The event detection module 280 detects the interaction event based on sensor data describing the user actions within the store. The event detection module 280 may receive sensor data from sensors of the shopping cart 100. For example, as described with respect to FIG. 1, the shopping cart 100 may detect that an item is being added to or removed from the shopping cart 100 by detecting a change in the overall weight of the contents of the storage area based on load data from load sensors. The shopping cart 100 may detect that an item is being added based on proximity data from proximity sensors indicating that something is approaching or has entered the storage area of the shopping cart. In these embodiments, the event detection module 280 may additionally or alternatively receive an indication from the shopping cart 100 that an interaction event has occurred. The event detection module 280 may receive sensor data from sensors within the store (e.g., motion sensors, security cameras) or sensors on the client device 120 (e.g., a phone camera). For example, a motion sensor on a shelf may detect that a user has removed an item from the shelf.

The event detection module 280 may identify the item associated with the interaction event. The event detection module 280 may identify the item through the item recognition module 150, which implements a machine-learning model to identify an item placed in the shopping cart 100 based on images of the item captured by the cameras 105 and the location of the shopping cart 100 within the store. The event detection module 280 may log the interaction event by generating an entry in an event log 276. The event log 276 is a table or database including entries describing interaction events. An entry may include the interaction and a time at which the event detection module 280 detected the interaction event. For example, the event detection module 280 may log that a user adds cookies to their shopping cart at 5:15 pm. In some embodiments, the event detection module may update the entry responsive to detecting that the user has performed a subsequent interaction with the item. For example, responsive to the automated checkout system 130 facilitating a transaction between the user and the store for the user to purchase the item, the event detection module 280 may update the entry to include an indication of whether the user purchased the item associated with the interaction event.

The region identification module 285 identifies a physical region within the store that contains a location of the shopping cart 100 at the time associated with the interaction event. To do so, the region identification module 285 identifies the location of the shopping cart 100 within the store at the time associated with the interaction event. In some embodiments, the region identification module 285 may identify the location of the shopping cart 100 through the cart tracker 220, which tracks the location of the shopping cart 100. As described with respect to FIG. 2A, the cart tracker 220 may access the location from the tracking system 190, which determines the location of the shopping cart 100 using sensors and a self-tracking algorithm to continuously track the location of the shopping cart 100. As described with respect to FIG. 1, the tracking system 190 may include sensors capable of capturing data useful for determining position, orientation, movement, or some combination thereof of the shopping cart 100 (e.g., an accelerometer, a gyroscope). The region identification module 285 may update the entry for the interaction event in the event log 276 to include the location of the shopping cart 100.

The region identification module 285 identifies a physical region within the store that contains the identified location of the shopping cart 100. To do so, the region identification module 285 may compare the coordinates of the identified location (e.g., on a global or locally stored map) to the sets of coordinates that define the bounds of the physical region. In response to the coordinates of the identified location being within the bounds of a physical region, the region identification module 285 identifies the physical region as containing the shopping cart 100. The region identification module 285 updates the entry for the interaction event to include the physical region.

The data point generation module 290 generates a data point for an interaction event. The data point represents the environmental effect in place in the physical region that contains the shopping cart 100 at the time associated with the interaction event. The data point may indicate whether the environmental effect is an experimental environmental effect or a control environmental effect. To generate the data point, the data point generation module 290 maps the time and physical region of the interaction event's entry in the event log 276 to a corresponding time and physical region of an entry in the effect log 275. For example, if the entry in event log 276 is for the interaction event of a user adding cookies to the shopping cart at 5:15 pm in the bakery section and the effect log 275 contains entries for an environmental effect of warm-toned lighting in the bakery section from 5:00 pm to 5:30 pm, the data point generation module 290 may generate a data point indicating that the user added a cookies to the shopping cart when a warm-toned lighting environmental effect was in place. In some embodiments, such as embodiments in which the effect application module 270 logs the environmental effects periodically, the data point generation module 290 may map the time stored in the event log 276 to the closest time in the effect log 275. In some embodiments, such as embodiments in which the effect application module 270 logs the environmental effects responsive to changing the effect, the data point generation module 290 may map the time stored in the event log 276 to the closest time in the effect log 275 that lies before the time in the event log 276.

The success computation module 295 generates a success metric for each environmental effect based on data points, the data points generated based on interaction events from a plurality of users. The success metric may represent the impact the environmental effect had on the user's in-store experience or the relative impact of the environmental effect compared to other applied environmental effects. For example, to compare the efficacy of the experimental environmental effect as compared to the control environmental effect to encourage user interactions within the store, the success computation module 295 may generate a success metric for the experimental environmental effect and a success metric for the control environmental effect. By comparing the success metrics for the experimental and control effects, the automated checkout system 130 may determine whether the experimental effect had an impact on the user's in-store experience.

In some embodiments, the success computation module 295 generates the success metric by computing the rate at which interaction events occurred within a physical region while the particular environmental effect was applied. For example, the success computation module 295 may compute the success metric as the total number of data points for the environmental effect divided by the total amount of time the environmental effect was in place. The success computation module 295 also may weight interaction events based on the value of the items with which the user interacted such that the success metric is higher if the interaction events correspond to higher value items and lower if the interaction events correspond to lower value items.

In some embodiments, the success computation module 295 may generate a success metric for an environmental effect in a particular region, such as generating a success metric for a warm-toned lighting condition in a canned goods aisle of a grocery store. The success computation module 295 may generate a success metric for the environmental effect for a particular time of day, day of the week, holiday, or season. For example, perhaps an environmental effect of warm-toned lighting impacts the user shopping experience more in the winter than in the summer.

The success computation module 295 may filter the data points before generating the success metric for the environmental effect. The success computation module 295 may filter based on time of day, day of the week, item type, or any other characteristic associated with the data points. In some embodiments, the success computation module 295 may filter data points based on whether the user performed a subsequent interaction with the item. For example, the success computation module 295 may filter out data points where users did not scan a barcode of the item or filter out data points where the automated checkout system 130 did not facilitate a transaction between the user and the store for the user to purchase the item.

In some embodiments, the success computation module 295 may filter out data points associated with items that were on the user's wish list at the start of the session between the user and the shopping cart 100. By filtering in this way, the success computation module 295 may generate a success metric that better represents the impact the environmental effect had on unanticipated or "impulse" interactions. For example, if the user enters a store with cookies on their wish list, the success computation module 295 may filter out the data point generated from the interaction event of the user adding the cookies to the shopping cart 100.

In some embodiments, the success computation module 295 may filter out interaction events that occurred close to a change in environmental effect in the physical region associated with the interaction event. To do so, the success computation module 295 may filter out data points with times within a threshold time from the time at which the effect application module 270 changed the environmental effect in the physical region associated with the data point. In some cases, the success computation module 295 may filter out interaction events that occurred at the edge of a physical region. For example, the success computation module 295 may filter data points where the location of the shopping cart 100 is within a threshold distance from the bounds of the physical region. Or the success computation module 295 may filter data points where the location of the shopping cart 100 is within a threshold distance from an edge of the physical region that borders another physical region with a different environmental effect in place at the same time.

In some embodiments, the success computation module 295 may use the generated success metrics to train a machine learning model to predict the best environmental effects for a particular user. Training examples may include data points corresponding to the particular user labeled by a success metric computed based on data points corresponding to the particular user. A data point corresponding to the particular user represents the environmental effects in place in the physical region at the time of the interaction event between the particular user and an item. The machine learning model may receive, as input, a set of data points corresponding to the particular user and output a set of environmental effects (at particular times and in particular physical regions).

In some embodiments, the success computation module 295 may generate a predicted success metric for an environmental effect using a machine learning model trained to receive the environmental effect as input and to output a predicted success metric. In some embodiments, the machine learning model may additionally receive a physical region to which the environmental effect is to be applied and a time at which the environmental effect is to be applied. Training examples may include previously applied environmental effects along with the physical regions and times at which they were applied. Each previously applied environmental effect may be labelled by the success metric generated by the success computation module 295 for the environmental effect.

Environmental Effect Application Process

Figure 3:
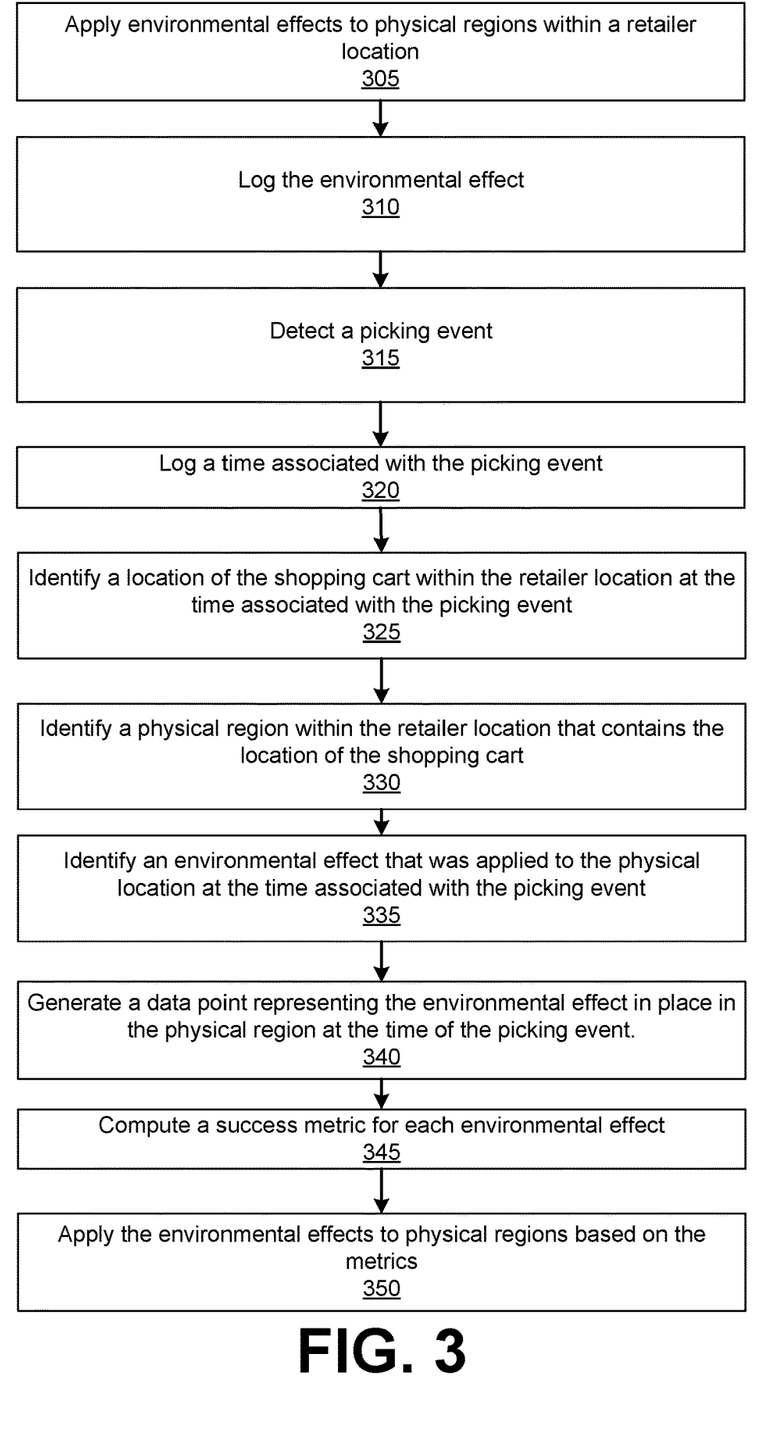
FIG. 3 is a flowchart illustrating an example method for identifying items in a shopping cart based on the location of the shopping cart within a store, in accordance with one or more embodiments.

FIG. 3 is a flowchart illustrating an example method for applying environmental effects to physical regions in a store, in accordance with one or more embodiments. The automated checkout system 130 applies 305 environmental effects to physical regions within a store over a time period. The automated checkout system 130 may apply the same environmental effect to each physical region within the store at the same time or may apply different effects to different physical regions at the same time. The environmental effects applied by the automated checkout system 130 include an experimental environmental effect and a control environmental effect. In some embodiments, the automated checkout system 130 may directly apply the environmental effects, whereas in other embodiments the automated checkout system 130 may communicate with the shopping cart 100, the client device 120, the user interface 110, or the store to apply 305 the environmental effects.

The automated checkout system 130 logs 310 each environmental effect that it applies by generating entries in an effect log 275. Each entry includes the environmental effect that was applied, a time at which the environmental effect was applied, and the physical region to which the environmental effect was applied. The automated checkout system 130 may log a set of coordinates that define the bounds of the physical location on a global or locally stored map. The automated checkout system 130 may log environmental effects periodically or responsive to changing the effect.

The automated checkout system 130 detects 315 an interaction event based on sensor data describing a user's actions within the store. The automated checkout system 130 may receive sensor data from sensors of the shopping cart 100, sensors within the store (e.g., security cameras), or sensors on the user's client device 120 (e.g., a phone camera). In detecting the interaction event, the automated checkout system 130 identifies the item associated with the interaction event.

The automated checkout system 130 logs 320 the interaction event and a time associated with the interaction event by generating an entry in the event log 276. The time associated with the interaction event is when the automated checkout system 130 detected the interaction event. In some embodiments, the automated checkout system 130 may update the entry responsive to detecting that the user has performed a subsequent interaction with the item.

The automated checkout system 130 identifies 325 a location of the shopping cart within the store at the time associated with the interaction event. In some embodiments, the automated checkout system 130 may identify the location of the shopping cart 100 through the cart tracker 220, which accesses the real-time location of the shopping cart 100. The automated checkout system 130 identifies 330 a physical region within the store that contains the location of the shopping cart. The automated checkout system 130 may compare the coordinates of the identified location (e.g., on a global or locally stored map) to the sets of coordinates that define the bounds of the physical region. In response to the coordinates of the identified location lying within the bounds of a physical region, the automated checkout system 130 identifies the physical region as containing the shopping cart 100.

The automated checkout system 130 identifies 335 an environmental effect that was applied to the physical location at the time associated with the interaction event. To identify the environmental effect, the automated checkout system 130 maps the time and physical region associated with the interaction event, stored in the event log 276, to a time and physical region associated with an environmental effect, stored in the effect log 275. The environmental effect module 160 may map the time stored in the event log 276 to the closest time in the effect log 275. The automated checkout system 130 may map the time stored in the event log 276 to the closest time in the effect log 275 that lies before the time in the event log 276. The automated checkout system 130 generates 340 a data point representing the environmental effect in place in the physical region at the time of the interaction event.

The automated checkout system 130 computes 345 a success metric for each environmental effect. The automated checkout system 130 may compute the success metric based on the number of data points for the environmental effect, for example by computing the total number of data points for the environmental effect divided by the total amount of time the environmental effect was in place for. The automated checkout system 130 may compute the success metric based on the number of interaction events that converted to item purchases (as stored in event log 276). The automated checkout system 130 may compute a success metric for an environmental effect in a particular region.

The automated checkout system 130 applies 350 environmental effects to physical regions based on the success metrics. For a given set of environmental effects, the automated checkout system 130 may apply the environmental effect with the highest success metric to the entire store. In some embodiments, the automated checkout system 130 may apply the environmental effect with the highest success metric for a particular time of day, day of the week, holiday, or season. In some embodiments, the automated checkout system 130 may, for each physical region, apply the environmental effect with the highest success metric for the physical region. The automated checkout system 130 may alternatively apply environmental effects responsive to corresponding success metrics exceeding threshold metric values.

Figure 4:
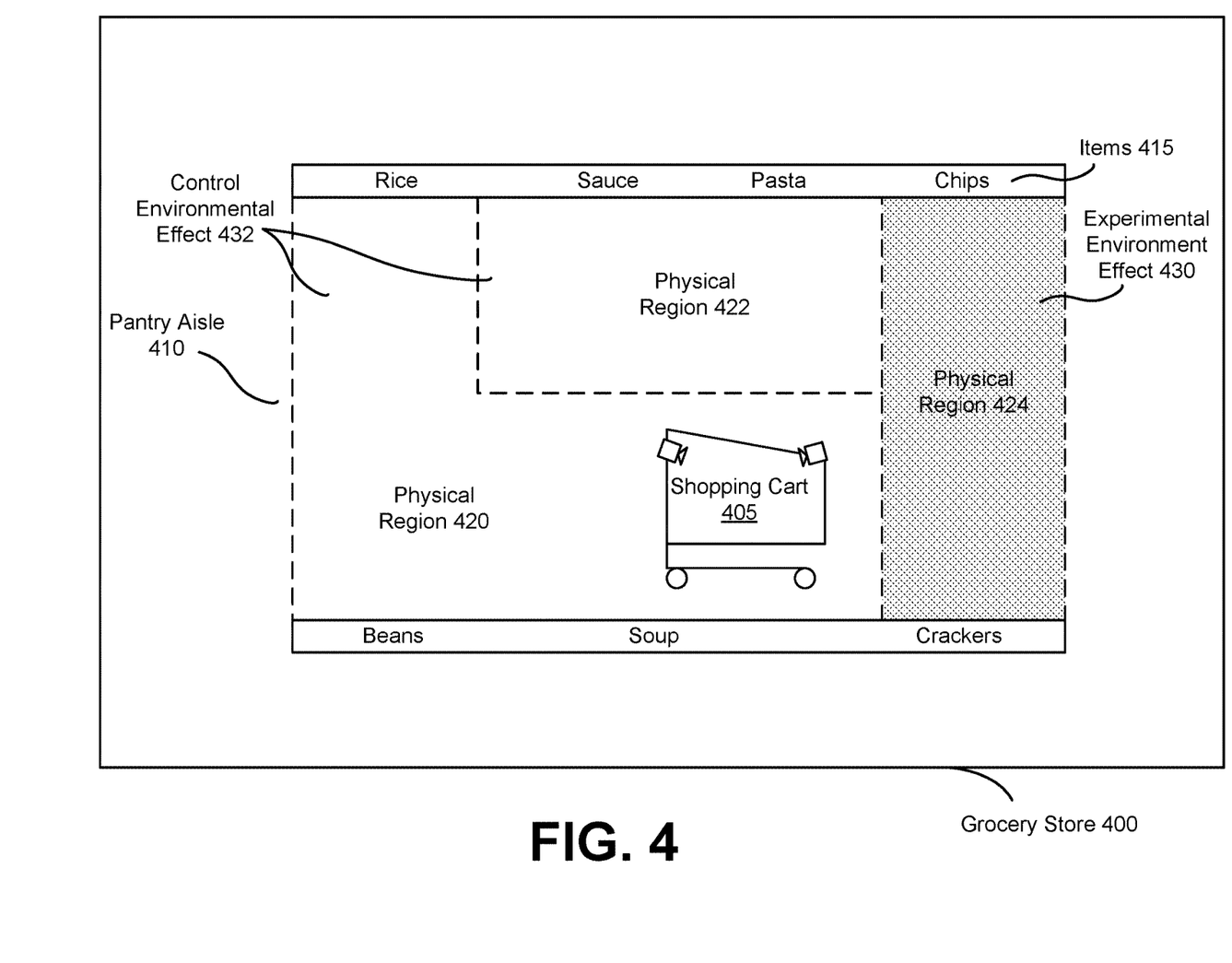
FIG. 4 illustrates example physical regions in a store with applied environmental effects, in accordance with one or more embodiments.

FIG. 4 illustrates example physical regions in a store with applied environmental effects, in accordance with one or more embodiments. The illustrated shopping cart 405 is located in a pantry aisle 410 of a grocery store 400. The pantry aisle 410 contains various items 415 (e.g., rice, sauce, pasta, chips, beans, soup, crackers). In the example, the environmental effect module 160 defines three physical regions in the pantry aisle 410. Physical region 420 contains rice, beans, and soup items. Physical region 422 contains sauce and pasta items. Physical region 424 contains chips and crackers items. To physical regions 420 and 422, the environmental effect module 160 applies a control environmental effect 432. To physical region 424, the environmental effect module 160 applies an experimental environmental effect 430. For example, the environmental effect module 160 may apply a control environmental effect of no change in the lighting condition and an experimental environmental effect of a lower brightness lighting condition (as indicated visually by the shaded physical region 424).

As the shopping cart 405 moves through the pantry aisle 410, the shopping cart 405 may pass through different physical regions. The shopping cart 405 in the example, for instance, may pass from the physical region 420 to the physical region 424. If the user of the shopping cart 405 adds an item 415 to the shopping cart 405 (i.e., performs an interaction event), the environmental effect module 160 generates a data point based on the interaction event. For example, if the user of the shopping cart 405 adds the item 415 while located in physical region 420, the environmental effect module 160 generates a data point indicating a user interaction with the item 415 while the user is within the control environmental effect. Similarly, if the user adds the item while located in physical region 424, the environmental effect module 160 generates a data point indicating a user interaction with the item 415 while the user is within the experimental environmental effect.

Other Considerations

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising one or more computer-readable media containing computer program code or instructions, which can be executed by a computer processor for performing any or all of the steps, operations, or processes described. In one or more embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method comprising:
    at a computer system comprising at least one processor and memory:
    applying a set of environmental effects to physical regions within a store during a time period, wherein each environmental effect is one of a control environmental effect or an experimental environmental effect, and wherein applying an environmental effect of the set of environmental effects comprises:
        transmitting instructions over a network to a device within a physical region, wherein the device is configured to applying the environmental effect to the physical region;
    logging, in an effect log, an entry for each of the set of environmental effects, wherein the entry for each of the set of environmental effects comprises the environmental effect applied, a time associated with the application of the environmental effect, and the physical region to which the environmental effect was applied;
    generating a set of data points based on a plurality of interaction events from a plurality of users and based on sensor data captured by automated shopping carts within the store, wherein generating a data point based on an interaction event from a user comprises:
        detecting an interaction event performed by the user based on first sensor data captured by sensors of an automated shopping cart associated with the user, wherein the interaction event indicates that the user has interacted with an item, and wherein the first sensor data comprises image data captured by a camera coupled to the automated shopping cart;
        logging, in an event log, an entry for the interaction event, wherein the entry comprises the interaction event and a time associated with the interaction event;
        identifying a location of the automated shopping cart within the store at the time associated with the interaction event, wherein the location of the automated shopping cart is identified based on second sensor data captured by sensors of the automated shopping cart;
        identifying a physical region within the store that contains the identified location of the automated shopping cart;
        identifying an environmental effect that was applied to the physical region at the time associated with the interaction event based on the logged environmental effects in the effect log; and
        generating a data point for the interaction event, wherein the data point represents the environmental effect in place in the physical region at the time of the interaction event;
    generating a success metric for each environmental effect of the set of environmental effects based on the generated data points; and
    applying an environmental effect of the set of environmental effects to a physical region based on the success metric associated with the environmental effect, wherein applying the environmental effect to the physical region comprises:
        transmitting instructions over a network to a device within the physical region to cause the device to apply the environmental effect.

2. The method of claim 1, wherein applying an environmental effect to a physical region within a store comprises changing a lighting of the physical region.

3. The method of claim 1, wherein applying environmental effects to physical regions within a store comprises applying environmental effects at periodic time intervals.

4. The method of claim 1, wherein applying environmental effects to physical regions within a store comprises applying the same environmental effect to each physical region.

5. The method of claim 1, wherein applying environmental effects to physical regions within a store comprises simultaneously applying an experimental environmental effect to a first physical region and a control environmental effect to a second physical region.

6. The method of claim 1, wherein generating a success metric for each environmental effect of the set of environmental effects based on the data points comprises filtering the data points based on whether the user performed a subsequent interaction with the item.

7. The method of claim 1, wherein generating a success metric for each environmental effect based on the data points comprises computing a success metric for each environmental effect in a particular physical region of the physical regions.

8. The method of claim 1, wherein generating a success metric for each environmental effect of the set of environmental effects further comprises filtering the generated data points based on whether the item is on a wish list of the user.

9. The method of claim 1, wherein generating a success metric for each environmental effect based on the data points further comprises filtering the data points based on whether the identified location of the automated shopping cart is within a threshold distance of a boundary between two physical regions.

10. The method of claim 1, wherein generating a success metric for each environmental effect based on the data points further comprises filtering data points with associated times within a threshold time from the time associated with the application of the environmental effect.

11. The method of claim 1, wherein the interaction event indicates that the user added the item to the automated shopping cart.

12. The method of claim 1, further comprising training a machine-learning model based on the generated success metrics for each environment effect of the set of environmental effects.

13. A non-transitory computer-readable medium storing instructions that, when executed by a processor, cause the processor to perform steps comprising:
applying a set of environmental effects to physical regions within a store during a time period, wherein each environmental effect is one of a control environmental effect or an experimental environmental effect, and wherein applying an environmental effect of the set of environmental effects comprises:
transmitting instructions over a network to a device within a physical region, wherein the device is configured to applying the environmental effect to the physical region;
logging, in an effect log, an entry for each of the set of environmental effects, wherein the entry for each of the set of environmental effects comprises the environmental effect applied, a time associated with the application of the environmental effect, and the physical region to which the environmental effect was applied;
generating a set of data points based on a plurality of interaction events from a plurality of users and based on sensor data captured by automated shopping carts within the store, wherein generating a data point based on an interaction event from a user comprises:
detecting an interaction event performed by the user based on first sensor data captured by sensors of an automated shopping cart associated with the user, wherein the interaction event indicates that the user has interacted with an item, and wherein the first sensor data comprises image data captured by a camera coupled to the automated shopping cart;
logging, in an event log, an entry for the interaction event, wherein the entry comprises the interaction event and a time associated with the interaction event;
identifying a location of the automated shopping cart within the store at the time associated with the interaction event, wherein the location of the automated shopping cart is identified based on second sensor data captured by sensors of the automated shopping cart;
identifying a physical region within the store that contains the identified location of the automated shopping cart;
identifying an environmental effect that was applied to the physical region at the time associated with the interaction event based on the logged environmental effects in the effect log; and
generating a data point for the interaction event, wherein the data point represents the environmental effect in place in the physical region at the time of the interaction event;
generating a success metric for each environmental effect of the set of environmental effects based on the generated data points; and
applying an environmental effect of the set of environmental effects to a physical region based on the success metric associated with the environmental effect, wherein applying the environmental effect to the physical region comprises:
transmitting instructions over a network to a device within the physical region to cause the device to apply the environmental effect.

14. The non-transitory computer-readable medium of claim 13, wherein the instructions for applying environmental effects to physical regions within a store comprise instructions that cause the processor to apply environmental effects at periodic time intervals.

15. The non-transitory computer-readable medium of claim 13, wherein the instructions for applying environmental effects to physical regions within a store comprise instructions that cause the processor to apply the same environmental effect to each physical region.

16. The non-transitory computer-readable medium of claim 13, wherein the instructions for applying environmental effects to physical regions within a store comprise instructions that cause the processor to simultaneously apply an experimental environmental effect to a first physical region and a control environmental effect to a second physical region.

17. The non-transitory computer-readable medium of claim 13, wherein the instructions for generating a success metric for each environmental effect of the set of environmental effects based on the data points comprise instructions that cause the processor to filter the data points based on whether the user performed a subsequent interaction with the item.

18. The non-transitory computer-readable medium of claim 13, wherein the instructions for generating a success metric for each environmental effect based on the data points comprise instructions that cause the processor to generate a success metric for each environmental effect in a particular physical region of the physical regions.

19. The non-transitory computer-readable medium of claim 13, wherein the instructions for generating a success metric for each environmental effect of the set of environmental effects further comprise instructions that cause the processor to filter the generated data points based on whether the item is on a wish list of the user.

20. A system comprising:
a processor; and
a non-transitory computer-readable medium storing instructions that, when executed by a processor, cause the processor to perform steps comprising:
applying a set of environmental effects to physical regions within a store during a time period, wherein each environmental effect is one of a control environmental effect or an experimental environmental effect, and wherein applying an environmental effect of the set of environmental effects comprises:
transmitting instructions over a network to a device within a physical region, wherein the device is configured to applying the environmental effect to the physical region;
logging, in an effect log, an entry for each of the set of environmental effects, wherein the entry for each of the set of environmental effects comprises the environmental effect applied, a time associated with the application of the environmental effect, and the physical region to which the environmental effect was applied;
generating a set of data points based on a plurality of interaction events from a plurality of users and based on sensor data captured by automated shopping carts within the store, wherein generating a data point based on an interaction event from a user comprises:
detecting an interaction event performed by the user based on first sensor data captured by sensors of an automated shopping cart associated with the user, wherein the interaction event indicates that the user has interacted with an item, and wherein the first sensor data comprises image data captured by a camera coupled to the automated shopping cart;
logging, in an event log, an entry for the interaction event, wherein the entry comprises the interaction event and a time associated with the interaction event;
identifying a location of the automated shopping cart within the store at the time associated with the interaction event, wherein the location of the automated shopping cart is identified based on second sensor data captured by sensors of the automated shopping cart;
identifying a physical region within the store that contains the identified location of the automated shopping cart;
identifying an environmental effect that was applied to the physical region at the time associated with the interaction event based on the logged environmental effects in the effect log; and
generating a data point for the interaction event, wherein the data point represents the environmental effect in place in the physical region at the time of the interaction event;

generating a success metric for each environmental effect of the set of environmental effects based on the generated data points; and applying an environmental effect of the set of environmental effects to a physical region based on the success metric associated with the environmental effect, wherein applying the environmental effect to the physical region comprises:
transmitting instructions over a network to a device within the physical region to cause the device to apply the environmental effect.

* * * * *